United States Patent
Chen

(10) Patent No.: US 9,613,225 B2
(45) Date of Patent: Apr. 4, 2017

(54) ELECTRONIC DEVICE, SYSTEM AND METHOD FOR SECURING DATA

(71) Applicant: Chiun Mai Communication Systems, Inc., New Taipei (TW)

(72) Inventor: Cheng-Hsien Chen, New Taipei (TW)

(73) Assignee: Chiun Mai Communications Systems, Inc., New Taipei (TW)

( * ) Notice: Subject to any disclaimer, the term of this patent is extended or adjusted under 35 U.S.C. 154(b) by 0 days.

(21) Appl. No.: 14/478,612

(22) Filed: Sep. 5, 2014

(65) Prior Publication Data

US 2015/0074827 A1 Mar. 12, 2015

(30) Foreign Application Priority Data

Sep. 9, 2013 (CN) .......................... 2013 1 0409463

(51) Int. Cl.
*G06F 17/00* (2006.01)
*G06F 21/62* (2013.01)

(52) U.S. Cl.
CPC .......... *G06F 21/6218* (2013.01); *G06F 21/62* (2013.01)

(58) Field of Classification Search
CPC ................................................... G06F 21/6218
USPC ........................................................ 726/28
See application file for complete search history.

(56) References Cited

U.S. PATENT DOCUMENTS

| | | | | |
|---|---|---|---|---|
| 2006/0251338 A1* | 11/2006 | Gokturk | ............ | G06F 17/30253 382/305 |
| 2008/0168554 A1* | 7/2008 | Kim | ...................... | G06F 21/608 726/18 |
| 2013/0104203 A1* | 4/2013 | Davis | .................... | H04L 9/3231 726/5 |
| 2014/0072188 A1* | 3/2014 | Liu | ..................... | G06K 9/00979 382/125 |
| 2015/0006491 A1* | 1/2015 | He | ..................... | G06F 17/30575 707/694 |

OTHER PUBLICATIONS

Michael Husken et al., "Strategies and Benefits of Fusion of 2D and 3D Face Recognition," Proceedings of the 2005 IEEE Computer Society Conference on Computer Vision and Pattern Recognition (CVPR'05), 2005 IEEE, pp. 1-9.*
Robert Brunelli et al., "Face Recognition: Features versus Templates," 1993 IEEE, pp. 1042-1052.*

* cited by examiner

*Primary Examiner* — Luu Pham
*Assistant Examiner* — Canh Le
(74) *Attorney, Agent, or Firm* — Steven M. Reiss

(57) ABSTRACT

An electronic device capable of securing data is provided. The electronic device includes a storage device for storing data and a number of securing strategies. Each of the securing strategies includes a securing condition for triggering a data securing action and one or more identifiers of the data to be secured. If the electronic device determines that a securing condition is met, the electronic device secured the data having the one or more identifiers corresponding to the met securing condition. A data securing system and method are also provided.

12 Claims, 2 Drawing Sheets

ELECTRONIC DEVICE, SYSTEM AND METHOD FOR SECURING DATA

CROSS-REFERENCE TO RELATED APPLICATIONS

This application claims priority to Chinese Patent Application No.201310409463.9 filed on Sep. 9, 2013 in China Intellectual Property Office, the contents of which are incorporated by reference herein.

FIELD

The subject matter herein generally relates to electronic devices, system and methods for securing data.

BACKGROUND

Peoples usually do not want others to find private files they stored in an public or private electronic device.

BRIEF DESCRIPTION OF THE DRAWINGS

Implementations of the present technology will now be described, by way of example only, with reference to the attached figures.

DETAILED DESCRIPTION

Figure 1:
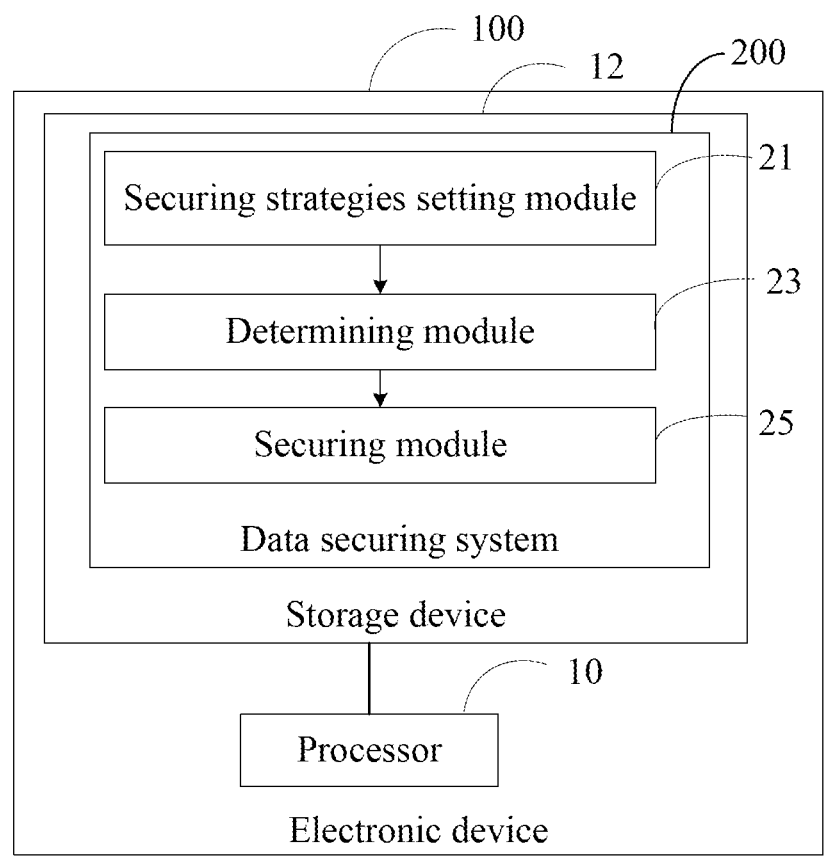
FIG. 1 is a block diagram illustrating an example embodiment of an electronic device running a data securing system for hiding data.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein, However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

Several definitions that apply throughout disclosure will now be presented. The term "module" refers to logic embodied in computing or firmware, or to a collection of software instruction, written in a programming language, such as Java, C, or assembly. One or more software instruction in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "coupled" is defined as connected, whether directly or indirectly through intervening components, and is not necessarily limited to physical connections. The connection can be such that the objects are permanently connected or releasably connected. The term "comprising" means "including, but not necessarily limited to", it specifically indicates open-ended inclusion or membership in a so-described combination, group, series and the like.

FIG. 1 illustrates a block diagram of an electronic device 100 capable of securing data. The electronic device 100 includes a processor 10 and a storage device 12 coupled to the processor 10. In one embodiment, the processor 10 can be a central processing unit (CPU), a microprocessor, or other data processor chips that perform functions of the electronic device 100. The storage device 12 can be an internal storage system, such as a flash memory, a random access memory (RAM) for temporary storing of information, and/or a read-only memory (ROM) for permanently storing information. The storage device 12 can also be an external storage system, such as a hard disk, a storage card, or a data storage medium. In at least one embodiment, the storage device 12 can include two or more storage devices such that one storage device is a memory and the other storage device is a hard drive. Additionally, one or more of the storage devices can be located externally relative to the electronic device 100. In at least one embodiment, the electronic device 100 can be a smart phone, a tablet computer, and the like.

The storage device 12 can store data, for example, audio files, text files, video files, and the like. The storage device 12 can further store a securing strategy database, the securing strategy database can include a number of securing strategies, each of the securing strategies can include a securing condition for triggering a data securing action and one or more corresponding identifiers of the data to be hidden. In at least one embodiment, the data securing condition included in a data securing strategy can correspond to one identifier, and all the data to be secured are marked by the same one identifier, and the identifier can be marked to the data to be secured in response to user input. In other embodiments, the data securing condition included in a data securing strategy can correspond to a number of identifiers, each data to be secured includes an unique identifier, and the unique identifier can be a file name of the data to be secured. In at least one embodiment, the securing condition can be that the user is unauthorized, or the electronic device 100 is not used in a preset location area, or the like. In at least one embodiment, the electronic device 100 hides the data having the one or more identifiers when the securing condition corresponding to the one or more identifiers of the data is met. Taking the securing condition of one securing strategy is that the user is unauthorized, and the identifier of the data to be secured is a file name "A.EXL" as an example, if the electronic device 100 determines that a current user of the electronic device 100 is unauthorized by an authorization process, such as by using a face recognition technology, the electronic device 100 hides the files named as A.EXL. It can be understand that securing data can be included hiding the data, deleting the data, or the like.

A data securing system 200 is running in the electronic device 100. The data securing system 200 is stored in the storage device 12. The data securing system 200 can include a number of modules, which are collection of software instructions executed by the processor 10.

In at least one embodiment, the data securing system 200 can include a securing strategies setting module 21, a determining module 23, and a data securing module 25.

The securing strategies setting module 21 can set a number of securing strategies for the data stored in the electronic device 100 in response to user input, each of the securing strategies set by the securing strategies setting module 21 can include the securing condition for triggering a data securing action and the identifier of each data to be secured described above. In at least one embodiment, the securing strategies setting module 21 stores the set securing strategies into the storage device 12 to form the securing strategy database. In at least one embodiment, the securing strategies setting module 21 provides a user interface for the user to set the securing strategies, and stores the user input securing strategies to the securing strategy database. In other embodiments, the securing strategies setting module 21 generates a prompt message to prompt the user to input the securing strategies when the user creates a data, and adds the securing strategies input by user into a header of the created date.

The determining module 23 can determine whether a securing condition is met. In at least one embodiment, the securing condition is that the user is unauthorized, the determining module 23 determines whether the securing condition is met by determining whether a face image of the user matches a pre-stored face image, by using a face recognition technology. If the determining module 23 determines that the face image of the user does not match the pre-stored face image, the determining module 23 determines that the securing condition is met. Otherwise, the determining module 23 determines that the securing condition is not met. In other embodiment, the securing condition is that the electronic device is not in a preset location area. The determining module 23 determines a current location of the electronic device 100, and further determines whether the current location of the electronic device 100 is within the preset location area, if the determining module 23 determines that the current location of the electronic device 100 is not within the preset location area, the determining module 23 determines that the securing condition is met, otherwise, the determining module 23 determines the securing condition is not met. In the embodiment, the determining module 23 determines the current location of the electronic device 100 by using a Global Position System (GPS) technology.

If the determining module 23 determines that a securing condition is met, the securing module 25 determines the securing strategy including the securing condition matches the met securing condition, obtains the identifiers included in the determined securing strategy, and secures the data having the identifiers. In the embodiment, the securing module 25 secures the data by hiding the data. In at least one embodiment, when the determining module 23 determines the securing condition is met, the securing module 25 obtains the securing strategy having the securing condition matches the met securing condition from the securing strategy database stored in the storage device 12. In other embodiments, when the determining module 23 determines the securing condition is met, the securing module 25 searches the header of each date stored in the electronic device 100 to obtain the securing strategy having the securing condition matches the met securing condition. In at least one embodiment, if the determining module 23 determines that more than one securing conditions are met, the securing module 25 determines more than one securing strategies, the securing condition of each determined securing strategy matches one of the met securing conditions, and the securing module 25 secures the data corresponding to each of the determined hiding strategies.

In some embodiments, the data may have a default securing strategy, the user can reset the default securing strategy of the data to update the securing strategy of the data via the securing strategies setting module 21. The securing module 25 secures the data when the determining module 23 determines that an updated securing condition in the updated securing strategy is met when the securing strategy of the data is updated/reset.

Figure 2:
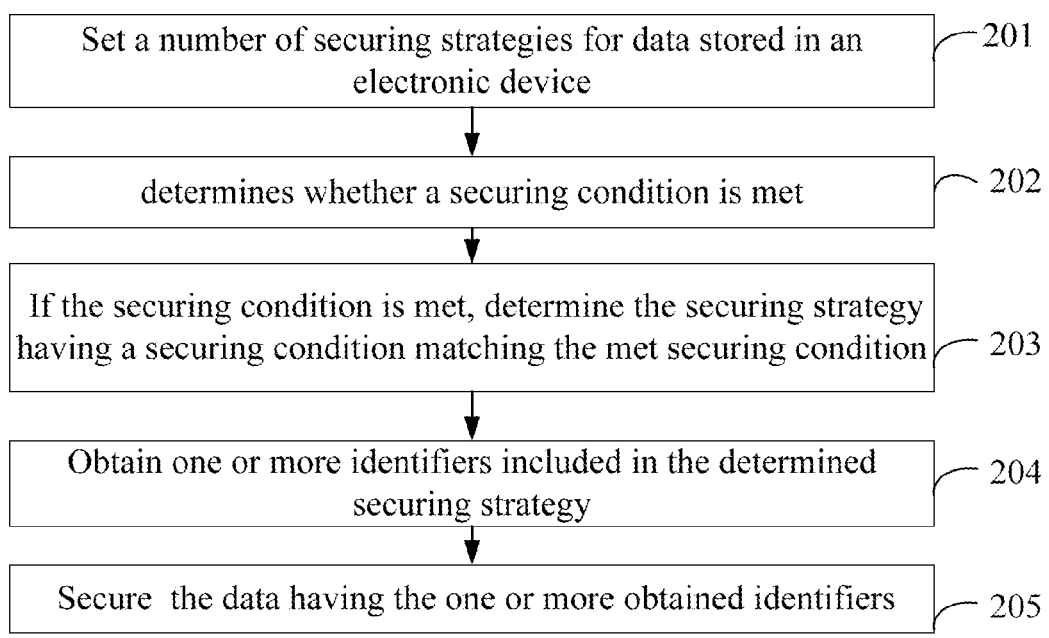
FIG. 2 is a flowchart of an example embodiment of a data securing method.

FIG. 2 illustrates an embodiment of a data securing method. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Additionally, the illustrated order of blocks is by example only and the order of the blocks can be changed. The example method can begin at block 201.

At block 201, a securing strategies setting module sets a number of securing strategies for the data stored in an electronic device in response to user input. Each securing strategies set by the securing strategies setting module can include a securing condition for triggering a data securing action and one or more identifiers of the data to be secured.

At block 202, a determining module determines whether a securing condition is met.

At block 203, if the determining module determines that a securing condition is met, a securing module determines the securing strategy having the securing condition matches the met securing condition.

At block 204, the securing module obtains the identifiers included in the determined securing strategy.

At block 205, the securing module secures the data having the obtained identifiers.

The embodiments shown and described above are only examples. Many further details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising:
   a storage device for storing data and a securing strategy database, the securing strategy database comprising a plurality of securing strategies, each of the securing strategies comprising a securing condition for triggering a data securing action and one or more identifiers of data to be secured;
   a processor coupled to the storage device;
   a securing strategies setting module, stored in the storage device, comprising at least one instruction configured to cause the processor to generate a prompt message to prompt a user to input the plurality of securing strategies when the user creates the data, wherein the securing strategies setting module is further configured to cause the processor to set the plurality of securing strategies for the data stored in the storage device by adding a securing strategy into a header of a corresponding data to be secured;
   a determining module, stored in the storage device, comprising at least one instruction configured to cause the processor to determine whether a securing condition is met; and a securing module, stored in the storage device, comprising at least one instruction configured to cause the processor to determine a securing strategy having the securing condition matching the met securing condition, obtain the one or more identifiers comprised in the determined securing strategy, and secure the data having the obtained one or more identifiers;

wherein when the data has a default securing strategy, the securing strategies setting module is further configured to cause the processor to reset the default securing strategy of the data to update the securing strategy of the data in response to user input;

wherein when the securing strategy of the data is updated, the securing module is further configured to cause the processor to secure the data when an updated securing condition in the updated securing strategy is determined to be met;

wherein securing the data including hiding the data or deleting the data.

2. The electronic device of claim 1, wherein the securing condition is that a user is unauthorized, and the determining module determines that the securing condition is met when the determining module determines that a face image of a user does not match a preset face image by using face recognition technology.

3. The electronic device of claim 1, wherein the securing condition is that the electronic device is not in a preset location area, the determining module obtains a current location of the electronic device, and determines the securing condition is met if the current location of the electronic device is not within the preset location area.

4. A data securing method applied in an electronic device, the electronic device comprising a processor and a storage device for storing data and a securing strategy database, the securing strategy database comprising a plurality of securing strategies, each of the securing strategies comprising a securing condition for triggering a data securing action and one or more identifiers of the data to be secured, the data securing method comprising:

generating a prompt message to prompt a user to input the plurality of securing strategies when the user creates the data;

setting the plurality of securing strategies for the data stored in the storage device by adding a securing strategy into a header of a corresponding data to be secured;

determining whether a securing condition is met by the processor;

determining the securing strategy having the securing condition matches the met securing condition, obtaining the one or more identifiers comprised in the determined securing strategy, and securing the data having the one or more obtained identifiers;

resetting the default securing strategy of the data to update the securing strategy of the data in response to user input when the data has a default securing strategy;

securing the data when an updated securing condition in the updated securing strategy is determined to be met when the securing strategy of the data is updated;

wherein securing the data including hiding the data or deleting the data.

5. The data securing method of claim 4, wherein the securing condition is that a user is unauthorized, and determining that the securing condition is met when determining that a face image of a user does not match with a preset face image by using face recognition technology.

6. The data securing method of claim 4, wherein the securing condition is that the electronic device is not in a preset location area, and determining the securing condition is met if the current location of the electronic device is not within the preset location area.

7. A data securing system applied in an electronic device, the electronic device comprising a processor and a storage device for storing data and a securing strategy database, the securing strategy database comprising a plurality of securing strategies, each of the securing strategies comprising a securing condition for triggering a data securing action and one or more identifiers of the data to be secured, the data securing system comprising:

a securing strategies setting module, stored in the storage device, comprising at least one instruction configured to cause the processor to generate a prompt message to prompt a user to input the plurality of securing strategies when the user creates the data, wherein the securing strategies setting module is further configured to cause the processor to set the plurality of securing strategies for the data stored in the storage device by adding a securing strategy into a header of a corresponding data to be secured;

a determining module, stored in the storage device, comprising at least one instruction configured to cause the processor to determine whether a securing condition is met; and a securing module, stored in the storage device, comprising at least one instruction configured to cause the processor to determine the securing strategy having the securing condition matches the met securing condition, obtain the one or more identifiers comprised in the determined securing strategy, and secure the data having the one or more obtained identifiers;

wherein when the data has a default securing strategy, the securing strategies setting module is further configured to cause the processor to reset the default securing strategy of the data to update the securing strategy of the data in response to user input;

wherein when the securing strategy of the data is updated, the securing module is further configured to cause the processor to secure the data when an updated securing condition in the updated securing strategy is determined to be met;

wherein securing the data including hiding the data or deleting the data.

8. The data securing system of claim 7, wherein the securing condition is that a user is unauthorized, and the determining module determines that the securing condition is met when the determining module determines that a face image of a user does not match with a preset face image by using face recognition technology.

9. The data securing system of claim 7, wherein the securing condition is that the electronic device is not in a preset location area, the determining module obtains a current location of the electronic device, and determines the securing condition is met if the current location of the electronic device is not within the preset location area.

10. The data securing system of claim 7, wherein when the securing condition comprised in each of the securing strategies corresponds to one identifier, all the data to be secured are marked by the same one identifier and the one identifier is marked in response to user input; and when the securing condition comprised in each of the securing strategies corresponds to a number of identifiers, each data to be secured comprises a unique identifier, and the unique identifier of the each data to be secured is a file name of the each data.

11. The electronic device of claim 1, wherein when the securing condition comprised in each of the securing strategies corresponds to one identifier, all the data to be secured are marked by the same one identifier and the one identifier is marked in response to user input; and when the securing condition comprised in each of the securing strategies corresponds to a number of identifiers, each data to be secured comprises a unique identifier, and the unique identifier of the each data to be secured is a file name of the each data.

12. The data securing method of claim 4, wherein when the securing condition comprised in each of the securing strategies corresponds to one identifier, all the data to be secured are marked by the same one identifier and the one identifier is marked in response to user input; and when the securing condition comprised in each of the securing strategies corresponds to a number of identifiers, each data to be secured comprises a unique identifier, and the unique identifier of the each data to be secured is a file name of the each data.

\* \* \* \* \*